United States Patent
Kurokawa (10) Patent No.: US 6,850,288 B2
(45) Date of Patent: Feb. 1, 2005

(54) APPARATUS FOR PROVIDING PROGRAMMING

(75) Inventor: Koya Kurokawa, Ehime (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 377 days.

(21) Appl. No.: 09/899,350

(22) Filed: Jul. 5, 2001

(65) Prior Publication Data

US 2002/0057390 A1 May 16, 2002

(30) Foreign Application Priority Data

Jul. 4, 2000 (JP) ........................................ 2000-201712

(51) Int. Cl.$^7$ ................................................. H04N 5/64
(52) U.S. Cl. ..................................... 348/836; 348/838
(58) Field of Search .............................. 348/836, 838, 348/738; 361/625, 681–683; 312/7.2; D14/125, 126, 129, 134, 336, 315; D21/324, 329; 381/374

(56) References Cited

U.S. PATENT DOCUMENTS

| | | | |
|---|---|---|---|
| 4,635,110 A | * | 1/1987 | Weinblatt .................... 348/837 |
| 5,003,300 A | * | 3/1991 | Wells ............................. 345/8 |
| 5,206,733 A | * | 4/1993 | Holdredge et al. .......... 348/836 |
| 5,281,957 A | * | 1/1994 | Schoolman ..................... 345/8 |
| 6,216,927 B1 | * | 4/2001 | Meritt ......................... 224/275 |
| 6,243,260 B1 | * | 6/2001 | Lundgren et al. ............ 361/683 |
| 6,249,427 B1 | * | 6/2001 | Carroll ........................ 361/683 |
| 6,252,970 B1 | * | 6/2001 | Poon et al. .................. 381/374 |
| 6,336,126 B1 | * | 1/2002 | Bjorklund et al. ........... 708/139 |

FOREIGN PATENT DOCUMENTS

| | | |
|---|---|---|
| JP | 9-37104 | 2/1997 |
| JP | 2000-225047 | 8/2000 |

* cited by examiner

Primary Examiner—Victor R. Kostak
(74) Attorney, Agent, or Firm—RatnerPrestia (57) ABSTRACT

An apparatus is used for providing programming. The apparatus comprises a display device having a clip for attaching the display device to another object and a main body for receiving the programming which is displayed on the display device. The main body either has a surface so that the main body sits on the object or a further object, or the main body has a hook for attaching the main body to one of the object or the further object. The apparatus further comprises a speaker unit which has a hinge portion. The speaker unit also have a hook for attaching the speaker unit to one of said further object, said another object and an additional object.

9 Claims, 7 Drawing Sheets

FIG. 7

APPARATUS FOR PROVIDING PROGRAMMING

FIELD OF THE INVENTION

The present invention relates to an apparatus for providing programming, and which is particularly useful in an area having limited spaces in which the apparatus may be located.

BACKGROUND OF THE INVENTION

In hospitalization, a patient is in bed most of the day. Watching television is an enjoyable pastime while lying in bed. Normally, the television receiver (hereinafter called TV) is placed on a bedside table or a movable over bed table. Unless the patient is in a private room, the patient desirably uses earphones because leakage of the TV sound may annoy others in the same room. Recently combination units of a TV and a video recording and reproducing apparatus such as a videocassette recorder (hereinafter called VCR), a digital disc driving device and the like have become popular. The combination unit is almost the same size as a TV only unit. With a combination unit, the patient can enjoy not only TV broadcasting but also video from the video reproducing apparatus. In addition, video and audio from the Internet can be reproduced on a TV.

However, there is a problem with the use of a combination unit or a TV because the furniture on which the combination unit sits occupies space.

Also, there is a problem because operation buttons for power supply, channel selection and the like are better to be near the patient to operate the buttons with the patient lying in bed. However, for the patient to watch TV, it is better for the screen to be slightly away from the patient. A remote controller might resolve this problem, but a place to keep the remote may be required. Also, the patient's ear may ache when using the earphone for a long time.

SUMMARY OF THE INVENTION

An apparatus is used for providing programming. The apparatus includes a display device for displaying programming. The display device has a clip for attaching the display device to an object. The apparatus also includes a main body for receiving the programming which is displayed on the display device. The main body either has a surface so that the main body sits on the object or a further object, or the main body has a hook for attaching the main body to one of the object or the further object.

DETAILED DESCRIPTION OF THE INVENTION

An exemplary embodiment of the present invention is hereinafter demonstrated with reference to the accompanying drawings, in which the same reference numerals denote the same components.

First, a description will be given regarding the structure of an apparatus for providing programming in a first exemplary embodiment of the present invention. Programming includes TV programs, movie, picture, data from the Internet, and so on.

In FIGS. 1 through 7, a display device 1, a main body 2, and a directional speaker unit 3 are placed onto a bedside rail 5 of a bed 4. A screen 11 such as a liquid crystal display screen (hereinafter called LCD screen) displays video such as from TV broadcasting and from a videocassette recorder. The display device 1 is attached onto the bedside rail 5 of the bed 4 using a clip portion 12, and a movable joint portion 13 couples the LCD screen 11 to the clip portion 12 so that the LCD screen 11 can turn toward the patient's desired direction. The display device 1 is equipped with speakers 14, and operation buttons 21 are provided in the main body 2 and in the directional speaker unit 3 to operate the TV and the VCR. A hook portion 22 is provided in the main body 2 for attaching the main body 2 to another object. The directional speaker unit 3 also has a hook portion 30 for attaching the directional speaker unit 3 onto desired portions. Videocassette insertion portion 23 is provided in the main body 2 for inserting a videocassette and a recess 24 is provided for housing the hook portion 22. A card type storage medium insertion portion 25 houses a card type storage medium (not illustrated in the drawing) such as a memory card. The main body 2 has various kinds of terminals 26 to connect with outside sources of data. Thus, terminals 26 may connect with the Internet, for example, for downloading image and sound data. Alternatively, using a cable such as a coaxial cable, an optical cable, an electric power line, etc., the main body 2 receives information data from communication channel through terminals 26. A hinge 31 provided in the directional speaker unit 3 enables to fold the speaker unit 3 at the hinge 31.

Figure 1:
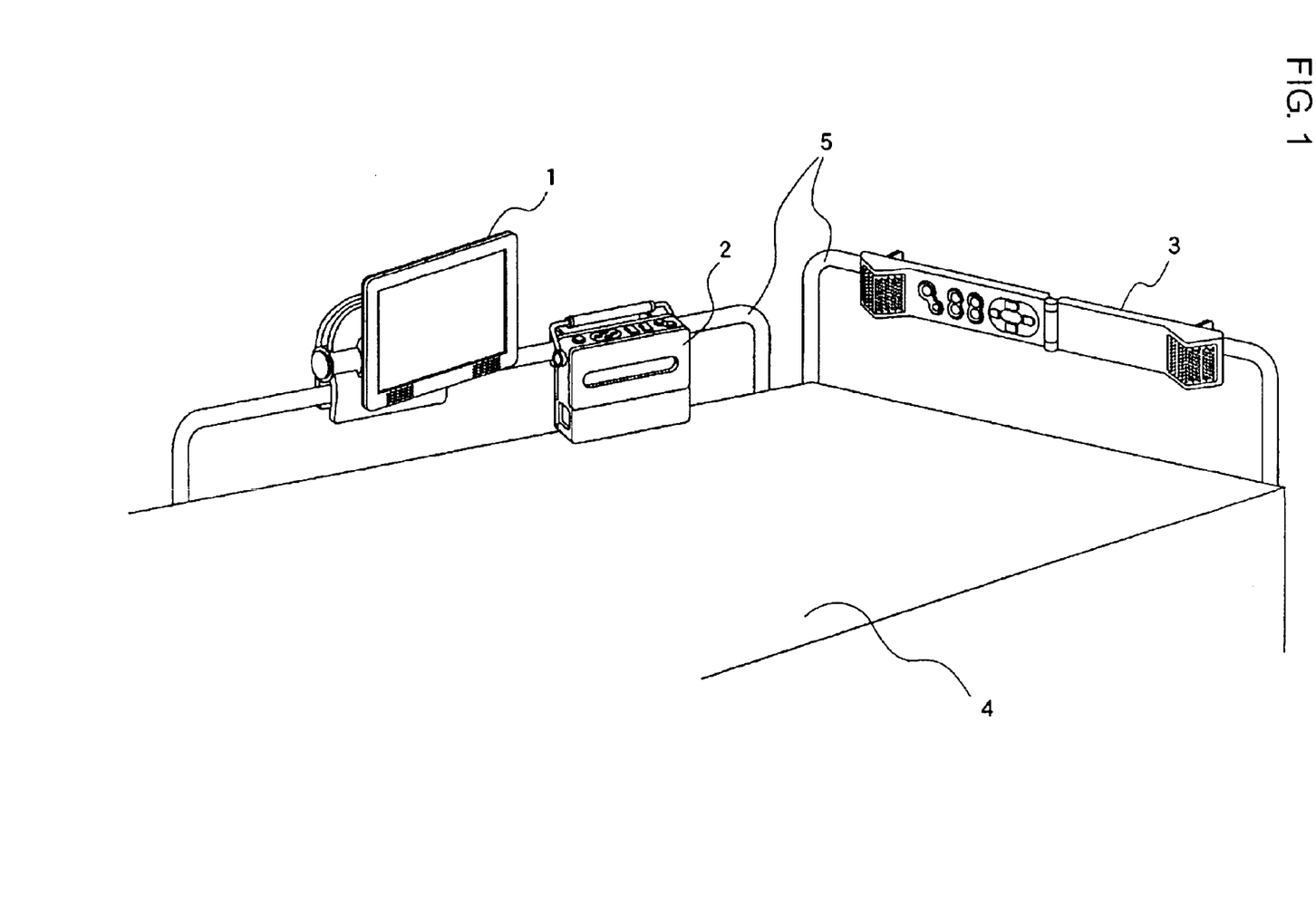
FIG. 1 is a perspective view of an apparatus for providing programming in an exemplary embodiment of the present invention.

Next, a placing method of the apparatus for providing programming is described. In hospitalization, a patient may be bedridden. In order to use the apparatus for providing programming in this situation, the display device 1 and the main body 2 are attached onto the bedside rail 5 of the bed 4 as shown in FIG. 1.

Figure 3A:
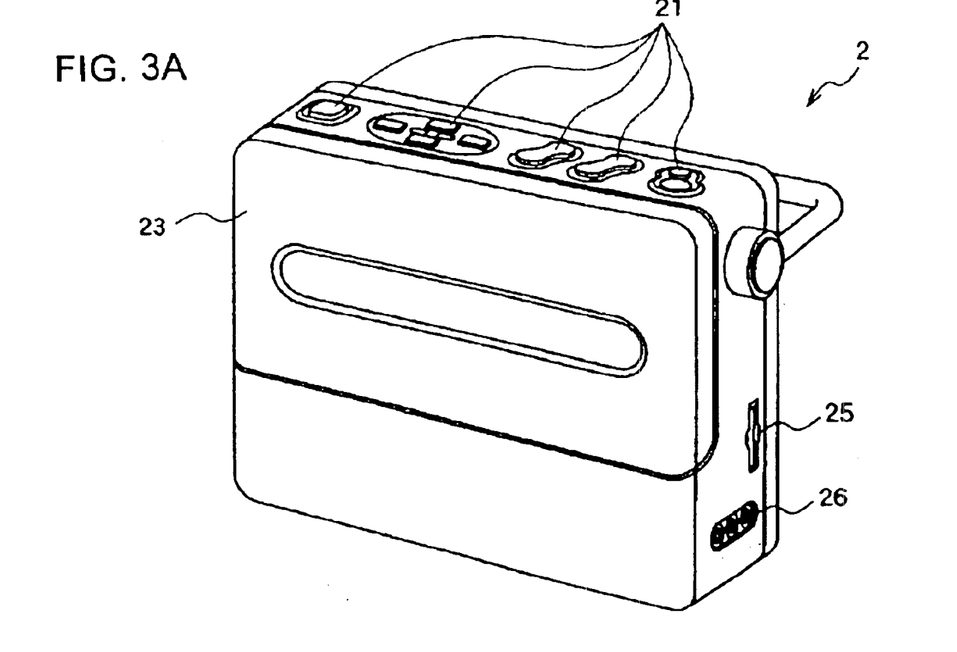
FIG. 3A is a front perspective view of the main body of the apparatus for providing programming.
Figure 3B:
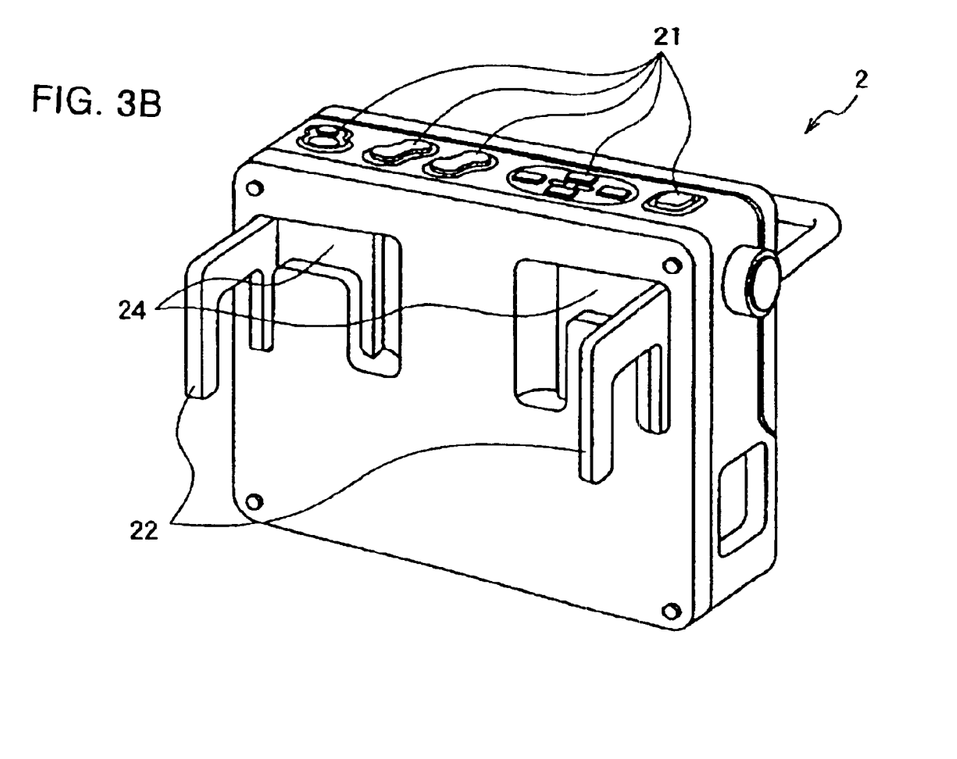
FIG. 3B is a back perspective view of the main body of the apparatus for providing programming according to an exemplary embodiment of the present invention.
Figure 4:
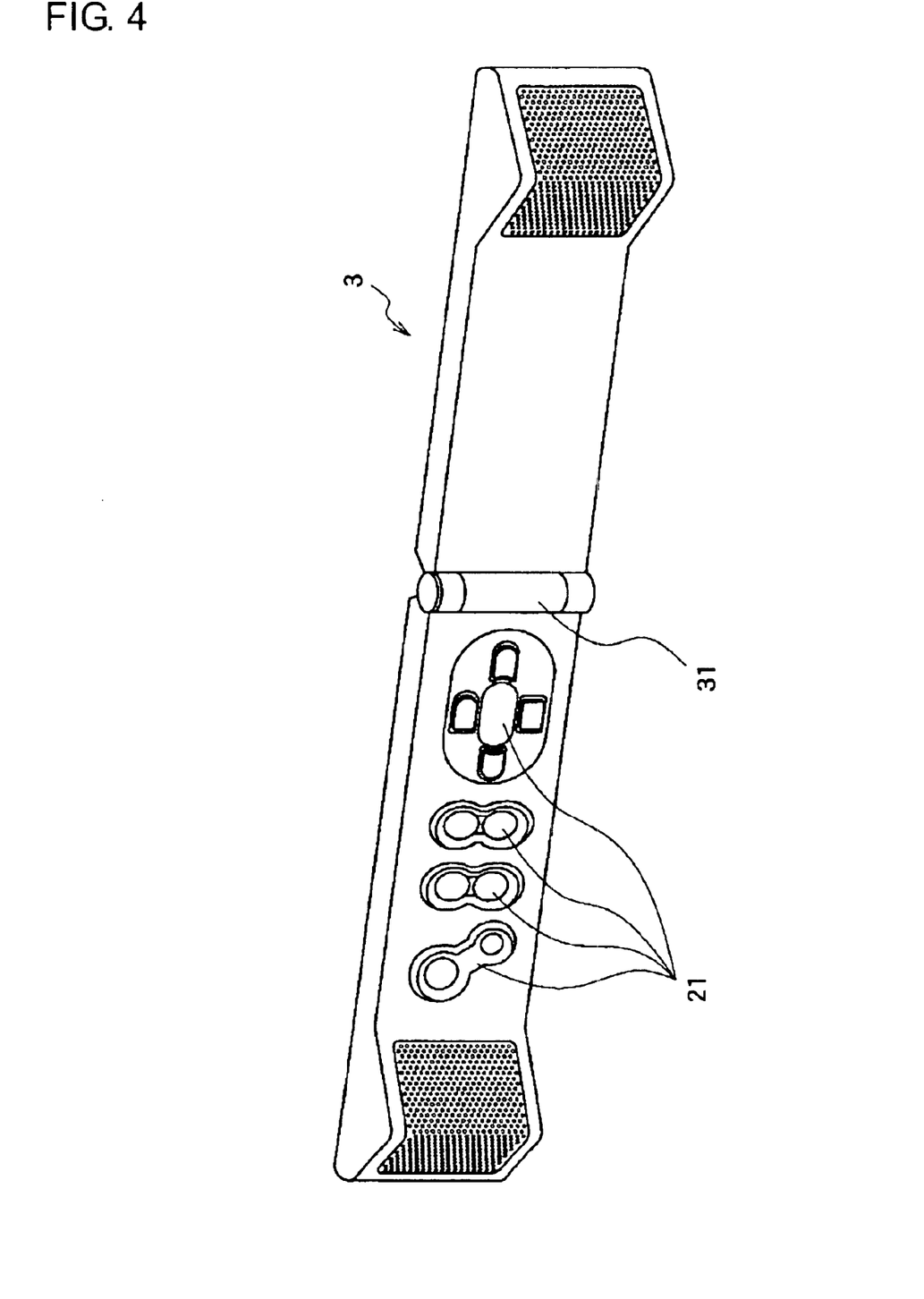
FIG. 4 is a perspective view of a directional speaker unit of the apparatus for providing programming.
Figure 5:
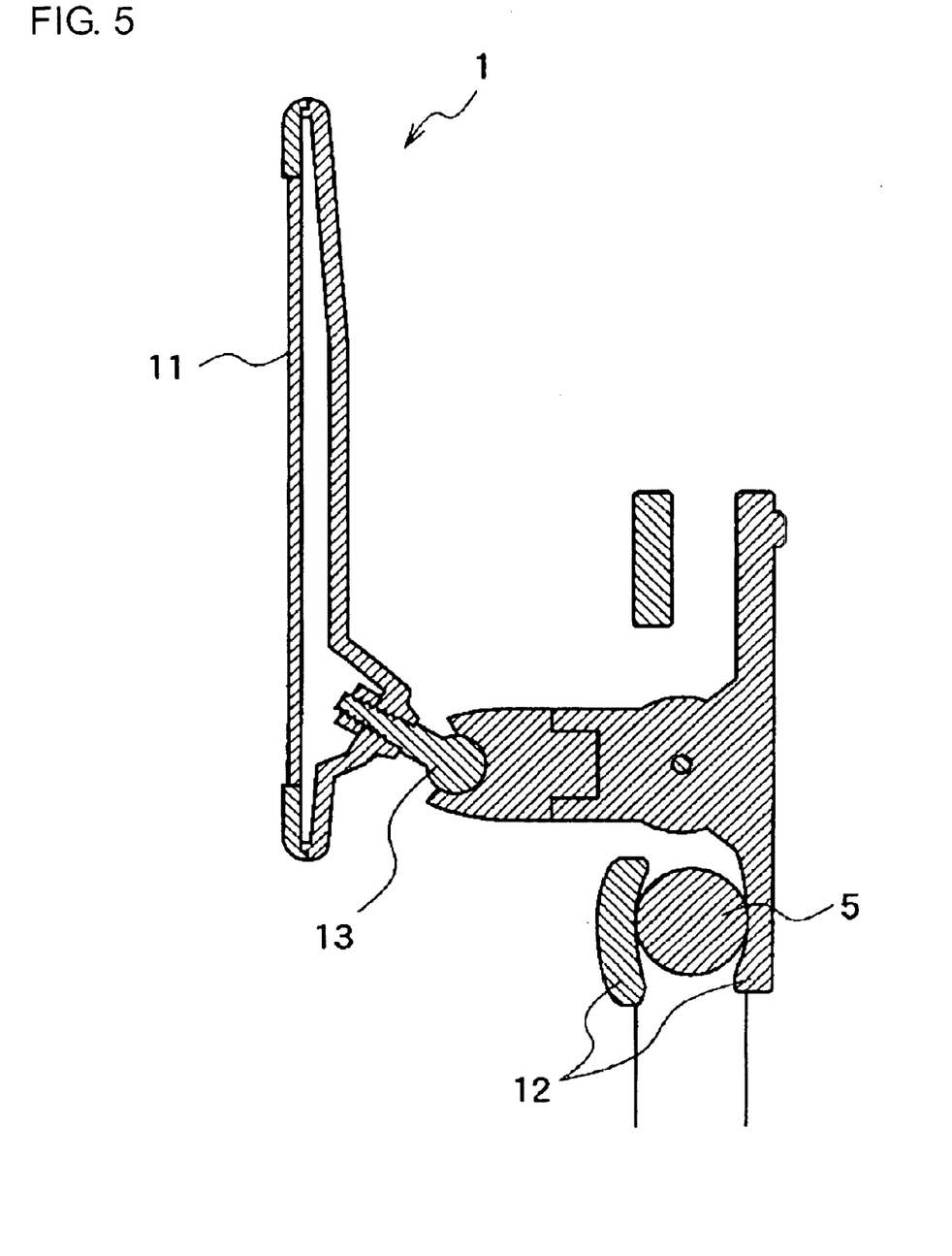
FIG. 5 is a cross-sectional view depicting the display device of the apparatus for providing programming placed onto a bedside rail of a bed.
Figure 6:
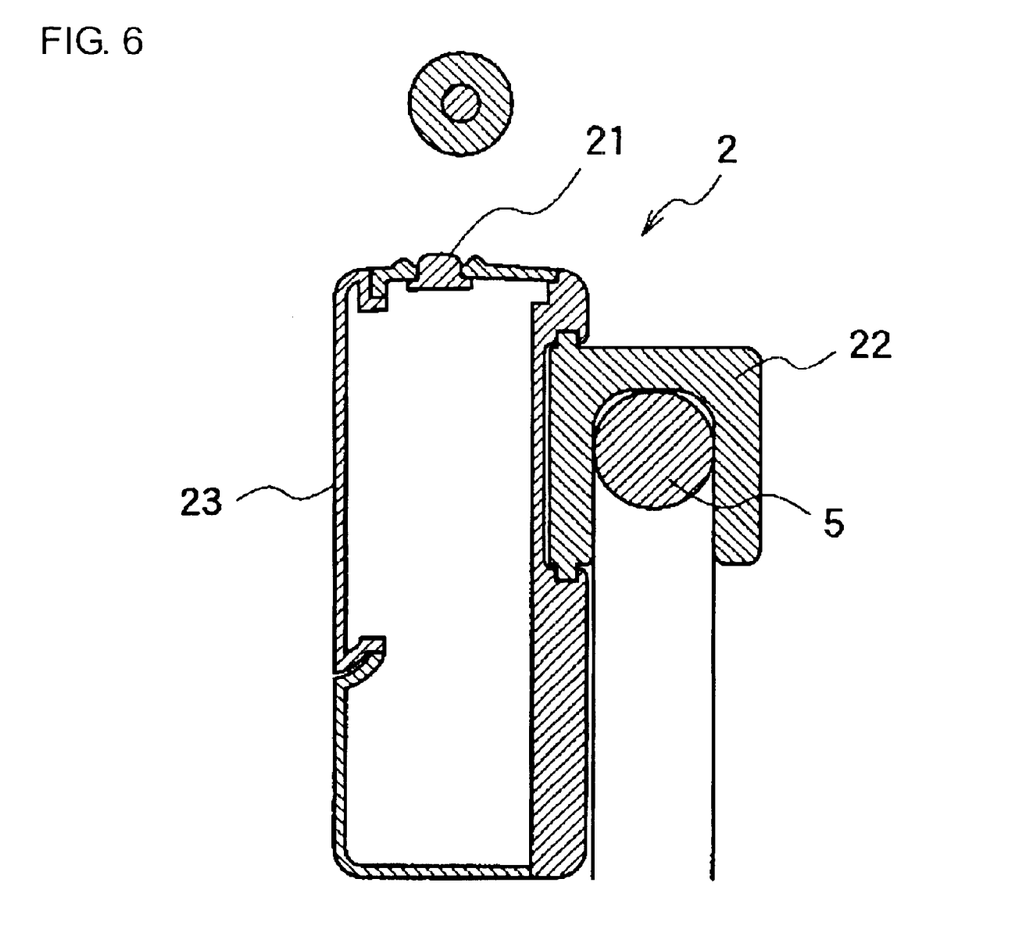
FIG. 6 is a cross-sectional view depicting the main body of the apparatus for providing programming placed onto a bedside rail of a bed.
Figure 7:
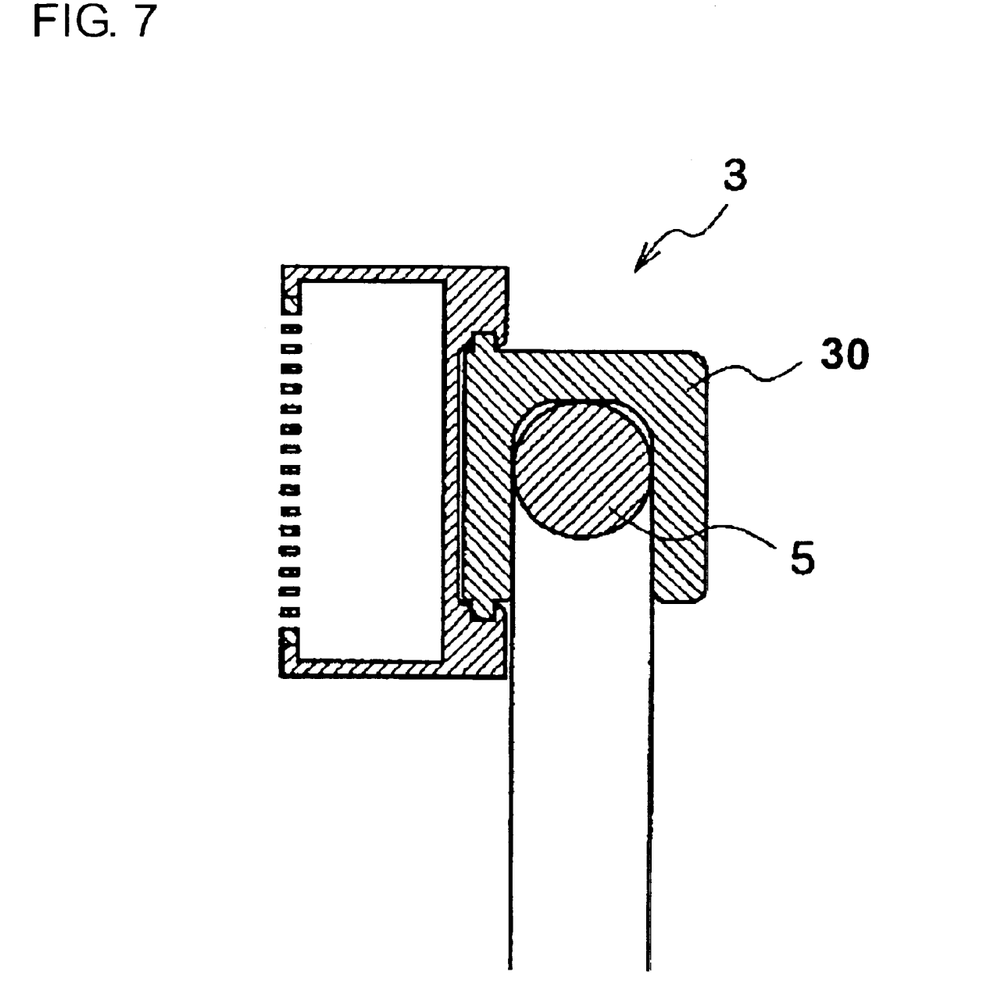
FIG. 7 is a cross-sectional view depicting the directional speaker of the apparatus for providing programming placed on a bedside rail of a bed.

The display device 1 has the clip portion 12, and the display device 1 can attach to the bedside rail 5 as shown in FIG. 5. The clip portion 12 is immovable by attaching it onto the bedside rail 5, but the LCD display 11 is arbitrarily movable relative to the clip portion 12 at the joint portion 13. So the patient can adjust the LCD display 11 to facilitate watching while lying in bed. The main body 2 has the hook portion 22 which can be housed into the recess 24 of the main body 2 when the hook portion 22 is not used. As FIG. 3B shows, the hook portion 22 is L-shaped and can rise to attach the main body 2 to the bedside rail 5. Because the operation buttons 21 are provided on the main body 2, the main body 2 is placed at hand. The directional speaker unit 3 has the hook portion 30 in the rear as well as the main body 2 to attach the speaker unit 3 to the bedside rail 5. The speaker unit 3 is also equipped with the hinge 31 to fold the speaker unit 3. An identification number of the speaker unit 3 may become visible by folding the speaker unit 3 at the hinge portion 31. This is useful because the apparatus is intended for use in places such hospitals and there is thus a high probability of the apparatus being rented.

The directional speaker unit 3 forms sound on a focused specified direction, and does not leak much sound to other directions. As shown in FIGS. 1 and 3B, the speaker unit 3 is attached to the bedside rail 5 using the hook portion 30. The display device 1, the main body 2, and the directional speaker unit 3 are connected with electrical cables to input and/or output electrical signals. Connection between the main body 2 and the speaker unit 3 may also be by wireless communication.

Next, performance of the apparatus for providing programming apparatus for providing programming is described in accordance with this exemplary embodiment. As shown in FIG. 1, the television receiver is set up. The patient operates the apparatus for providing programming using the operation buttons 21 on the main body 2. The operation buttons 21 control, for example, power, channel, volume, eject, video playback, fast forwarding, rewinding, stop, and so on. The patient turns on the power and selects a channel using the operation buttons 21.

Sound from the directional speaker unit 3 is focused on the patient, and does not leak much sound to undesired directions. As a result, troubling of other people in the same room is reduced. An earphone can be used to hear the sound by connecting to the main body 2, instead of the directional speaker unit 3.

In order to enjoy video, the patient presses a tape eject button of the operation buttons 21 to open the cassette cover of the videocassette insertion portion 23 of the main body 2. The patient inserts a desired videocassette into the video insertion portion 23 and presses a playback button after closing the cassette cover to enjoy the video. The patient can operate fast-forward, rewind, stop etc. in addition to the playback operation. The operation buttons 21 mentioned above are also provided on the directional speaker unit 3, so the patient may use the buttons on the speaker unit 3.

A memory card may be inserted into the card type storage medium insertion portion 25 to read data from the memory card, and an external device, such as a game device to play games, can be connected to terminals 26.

Figure 2:
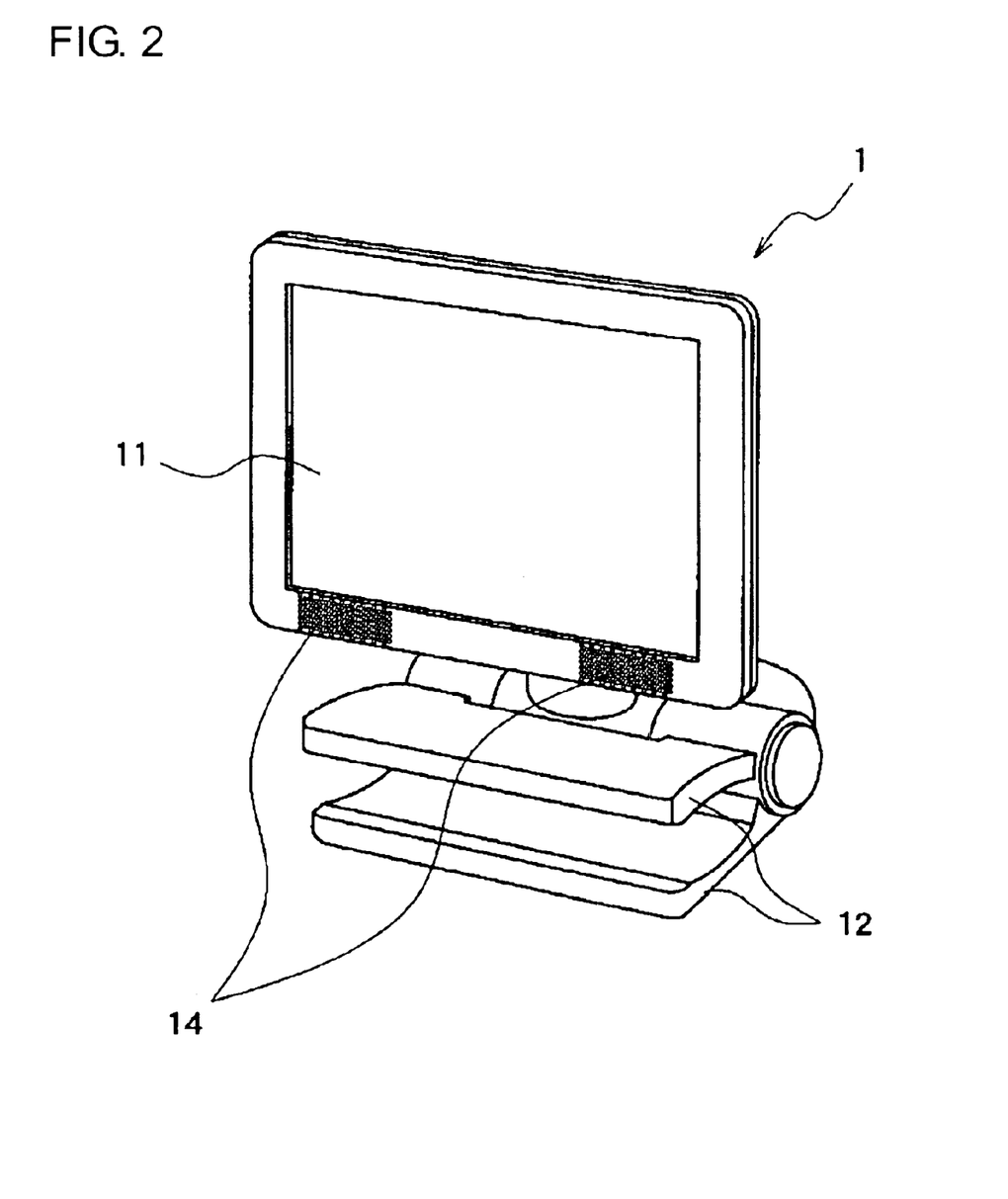
FIG. 2 is a perspective view of a display device of the apparatus for providing programming.

Additionally, the display device 1, the main body 2, and the directional speaker unit 3 may be placed in other places mentioned above. For example, as shown in FIG. 5, the clip portion 12 has a substantially planar surface. So the display device 1 can stand by itself by placing the planar surface of the clip portion 12 on a horizontal surface, as shown in FIG. 2. Therefore, the display device 1 can sit on furniture such as a desk without being hooked. Also, the main body 2 can sit on the furniture without being hooked. The directional speaker unit 3 may be placed somewhere under a pillow, or by folding it at the hinge 31 to stand up by itself on the furniture even though it is a thin model speaker.

In addition, the apparatus for providing programming can be used not only when the patient is in the hospital bed, but also when being in a bed at home. In that case, a speaker 14, which is provided in the display device 1, may be used, so connection between the directional speaker unit 3 and the main body 2 is not necessary since there is reduced concern about sound leakage.

Usage of the apparatus for providing programming is not limited only in a bed, but also anywhere if there is an object to attach to, even when there is not enough space for placement of a conventional TV. Also, it can be placed on furniture such as a desk when there is no object to attach to.

In addition to the LCD display device of the television receiver with VCR, the clip portion 12 may be provided to the LCD device for a game machine, a personal computer, and the like.

As described above, the apparatus for providing programming is comprised of the display device 1, the main body 2 having operation buttons 21 for operating the television receiver and videocassette recorder, and videocassette insertion portion 23. The display device 1 is separated from the main body 2, whereby the display 1 may be placed away from the patient while the main body 2 which is providing operation buttons is near to the patient, so it is easy to watch and operate them. And it is easy to find a suitable place because the display device 1 can be installed anywhere if there is a place where the clip portion 12 can attach to. The main body 2 also can be placed anywhere the hook portion 22 can attach to. This is effective in utilizing space and location.

In other words, the display device 1 having the clip 12 which is movable against the LCD screen 11 and fixed by attaching onto a desired portion, and the main body 2 having L-shaped hook portion 22 for fixing by attaching a desired portion, are placed on the bedside rail 5 or other places without requiring much space.

Further, the display device 1 can be placed even when there is nowhere to attach to because it can stand by itself on a desk or something with the LCD screen 11 almost perpendicular to the clip portion 12.

In addition, using the directional speaker unit 3, sound leakage to others in the same room is prevented because the sound from the speaker focuses on the patient.

In this embodiment, the invention is described using a VCR as an example. However, the built-in recording and playback device is not limited to a VCR. For example, a Digital Disk device (or other type of physical medium) can be used. In addition, the display screen device is not limited to a LCD. Flat type display device, such as a plasma display panel, FED element, and an electro luminescent display device, may be used. Further, in an exemplary embodiment of the present invention the operation buttons are located on the main body. However, it is understood that the operation buttons may be located in another location (for example on a remote control).

What is claimed is:

1. Apparatus for providing programming, comprising:
    a display device for displaying an image, said display device having a clip for attaching said display device to another object; and
    a main body for receiving the programming which is displayed on said display device, said main body having a surface so that said main body sits on said another object or a further object;
    wherein said clip has a joint portion for turning said display device, said clip for attaching said display device to said another object is alternatively used for sitting with said display device on said another object.

2. Apparatus for providing programming according to claim 1 further comprising a speaker unit having a speaker, wherein said speaker unit includes a hinge.

3. Apparatus for providing programming according to claim 1 further comprising a speaker unit having a speaker, wherein said speaker unit includes a hook for attaching said speaker unit to one of said further object, said another object and an additional object.

4. Apparatus for providing programming according to claim 3, wherein said speaker unit further includes a hinge.

5. Apparatus for providing programming according to claim 1 wherein said display device separates from said main body.

6. Apparatus for providing programming, comprising:
- a display device for displaying an image, said display device having a clip for attaching said display device to another object; and
- a main body for receiving the programming which is displayed on said display device, said main body having a hook for attaching to one of said another object or a further object;

wherein said clip has a joint portion for turning said display device, said clip for attaching said display device to said another object is alternatively used for sitting with said display device on said another object.

7. Apparatus for providing programming according to claim 6 wherein said display device separates from said main body.

8. Apparatus for providing programming according to claim 6 further comprising a speaker unit having a speaker, wherein said speaker unit includes a hook for attaching said speaker unit to one of said further object, said another object and an additional object.

9. Apparatus for providing programming according to claim 8, wherein said speaker unit further includes a hinge.

* * * * *